US009094449B2

(12) United States Patent
Brueckner et al.

(10) Patent No.: US 9,094,449 B2
(45) Date of Patent: *Jul. 28, 2015

(54) FIGHT-THROUGH NODES FOR SURVIVABLE COMPUTER NETWORK

(71) Applicant: Architecture Technology Corporation, Minneapolis, MN (US)

(72) Inventors: Stephen K. Brueckner, Ithaca, NY (US); Kenneth J. Thurber, Hopkins, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,368

(22) Filed: Jan. 27, 2014

(65) Prior Publication Data

US 2014/0310810 A1 Oct. 16, 2014

Related U.S. Application Data

(63) Continuation-in-part of application No. 13/352,148, filed on Jan. 17, 2012, now Pat. No. 8,640,238.

(60) Provisional application No. 61/534,817, filed on Sep. 14, 2011.

(51) Int. Cl.
*H04L 29/06* (2006.01)
*G06F 9/455* (2006.01)
*G06F 21/55* (2013.01)

(52) U.S. Cl.
CPC ........ *H04L 63/1441* (2013.01); *G06F 9/45533* (2013.01); *G06F 21/552* (2013.01); *H04L 63/1416* (2013.01); *H04L 63/20* (2013.01)

(58) Field of Classification Search
USPC ................ 726/22, 23; 713/151–153; 709/224
See application file for complete search history.

(56) References Cited

U.S. PATENT DOCUMENTS

| 7,076,801 B2 | 7/2006 | Gong et al. |
| 7,350,234 B2 | 3/2008 | Goseva-Popstojanova et al. |
| 7,607,129 B2 | 10/2009 | Rosu et al. |

(Continued)

OTHER PUBLICATIONS

Alberts et al., "Mission Assurance Analysis Protocol (MAAP): Assessing Risk in Complex Environments," retrieved from http://www.sei.cmu.edu/reports/05tn032.pdf, Sep. 2005, 59 pp.

(Continued)

*Primary Examiner* — Beemnet Dada
(74) *Attorney, Agent, or Firm* — Shumaker & Sieffert, P.A.

(57) ABSTRACT

A survivable network is described in which one or more network device includes enhanced functionality to fight through cyber attacks. A Fight-Through Node (FTN) is described, which may be a combined hardware/software system that enhances existing networks with survivability properties. A network node comprises a hardware-based processing system having a set of one or more processing units, a hypervisor executing on each one of the processing units, and a plurality of virtual machines executing on each of the hypervisor. The network node includes an application-level dispatcher to receive a plurality of transaction requests from a plurality of network communication session with a plurality of clients and distribute a copy of each of the transaction requests to the plurality of virtual machines executing on the network node over a plurality of time steps to form a processing pipeline of the virtual machines.

15 Claims, 9 Drawing Sheets

(56) References Cited

U.S. PATENT DOCUMENTS

| | | | |
|---|---|---|---|
| 8,510,747 | B2 | 8/2013 | Tian et al. |
| 8,640,238 | B2 | 1/2014 | Brueckner et al. |
| 2009/0313620 | A1 | 12/2009 | Sedukhin et al. |
| 2010/0043073 | A1 | 2/2010 | Kuwamura |
| 2010/0269167 | A1 | 10/2010 | Kashima |

OTHER PUBLICATIONS

Bargar, "DOD Global Information Grid Mission Assurance," CrossTalk, The Journal of Defense Software Engineering, retrieved at http://www.crosstalkonline.org/storage/issue-archives/2008/200807/200807-Bargar.pdf, Jul. 2008, 3 pp.

Department of Defense Instruction, "Information Assurance (IA) Implementation," retrieved from http://www.dtic.mil/whs/directives/corres/pdf/850002p.pdf, Feb. 6, 2003, 102 pp.

Duren, "Organically Assured and Survivable Information Systems (OASIS) Technology Transition Assessment (OTTA)," Defense Advanced Research Projects Agency, DARPA Order No. K128, N684m P004, Mar. 2004, 56 pp.

Leech et al., "Socks Protocol Version 5," Network Working Group, RFC:1928, Mar. 1996, 9pp.

Maftia, "Malicious-and Accidental-Fault Tolerance for Internet Applications," IST Research Project IST-1999-11583, retrieved at http://spiderman-2.laasfr/TSF/cabernet/maftia/index.html, Jan. 1, 2000-Feb. 28, 2003, 2 pp.

Reiser et al., "VM-FIT: Supporting Intrusion Tolerance with Virtualisation Technology," retrieved from http://wraits07.di.fc.ul.pt/9.pdf, Proceedings of the 1st Workshop of Recent Advances on Intrusion-Tolerant Systems, Mar. 23, 2007, 5 pp.

Reynolds et al., "The Design and Implementation of an Intrusion Tolerant System," IEEE Proceedings of the International Conference on Dependable Systems and Networks (DSN'02), 2002, 6 pp.

Shi et al., "An Intrusion-Tolerant and Self-Recoverable Network Service System Using a Security Enhanced Chip Multiprocessor," retrieved from http://users.ece.gatech.edu/~leehs/pub/icac05.pdf, Second International Conference on Autonomic Computing (IAC 2005), Jun. 13-16, 2005, 11 pp.

Prosecution History from U.S. Patent No. 8,640,238, dated Sep. 30, 2013 through Sep. 30, 3013, 14 pp.

FIGHT-THROUGH NODES FOR SURVIVABLE COMPUTER NETWORK

This application is a continuation-in part of U.S. application Ser. No. 13/352,148, filed Jan. 17, 2012, which claims the benefit of U.S. Provisional Application Ser. No. 61/534,817, filed Sep. 14, 2011, the content of each of which are hereby incorporated by reference.

TECHNICAL FIELD

The invention relates to computer networks and, more specifically, detection and recovery from network attacks.

BACKGROUND

Despite existing security efforts, computer networks are susceptible to attack and compromise. Complete isolation of a network or system provide by the network may not always be an acceptable response to a detected cyber attack.

SUMMARY

The techniques allow for a "survivable network" in which one or more network device may be able to "fight through" cyber attacks. This may be of particular critical network operations. The techniques provide for a "survivable" network that may be capable of carrying on, in a perhaps degraded state, during an attack so as to continue to provide critical services. Because human reaction times can be very slow in comparison to the speed of cyber attacks, the survivable system may be utilized to provide an automated response capability so the network can dynamically respond to threats.

A Fight-Through Node (FTN) is described herein, which may be a combined hardware/software system that enhances existing networks with survivability properties. The Fight-Through Nodes may replace existing nodes within the network, such as nodes hosting critical services in a network. Example nodes include database servers, information systems, application servers, email servers, FTP servers, web servers or even network infrastructure such as layer three routers or layer two switches, firewalls, intrusion detection system, gateways or the like. Additional example nodes include client devices, laptops, mobile devices, end-user workstations and the like. Networks equipped with FTNs as described here may be resilient, enabling critical processes to operate despite attacks on the node or impacts on other parts of the network.

As enterprises rely ever more heavily on their information systems, the frequency and sophistication of cyber attacks continues to rise. The techniques described herein improve the survivability of a network's critical client and server nodes, infrastructure nodes, and the like, making it possible to fight through cyber attacks. Rather than being disabled by such attacks, servers providing critical services will continue to operate in spite of the attack. Entities may use the FTNs described herein to replace critical nodes their network or information systems. The assurance provided by the FTNs may be applicable to a variety of industries having critical systems (e.g., utilities, health care, financial services, transportation, military, telecom, retail, information technology).

In one example, a network node comprises a hardware-based processing system having a set of one or more processing units, and a hypervisor executing on each one of the processing units; and a plurality of virtual machines executing on each of the hypervisor. The network node includes an application-level dispatcher to receive a plurality of transaction requests from a plurality of network communication sessions with a plurality of clients and distribute a copy of each of the transaction requests to the plurality of virtual machines executing on the network node over a plurality of time steps to form a processing pipeline of the virtual machines.

A method comprises receiving, with a network node, a plurality of transaction requests from a plurality of network communication sessions with a plurality of clients, and distributing a copy of each of the transaction requests to a plurality of virtual machines executing on the network node over a plurality of time steps to form a processing pipeline of the virtual machines. The method further comprises, upon distributing a threshold number (n) of the transaction requests to the plurality of virtual machines, detecting whether any of the virtual machines in the processing pipeline has been compromised. When none of the virtual machines in the processing pipeline has been compromised, the processing pipeline of virtual machines are checkpointed by recording a state for each of the plurality of virtual machines. When at least one of the virtual machines in the processing pipeline has been compromised, the compromised virtual machines may be removed from the processing pipeline.

The techniques provide improved survivability in networks via technologies enhancing likelihood of continuity and transaction completion, allowing network operation to persist under conditions of extreme attack and/or degraded performance.

Architectural and operational strategies are described that may ensure survivability, resiliency, and adaptability to "fight through" severe cyber degradation and compromise, and to make the adversary's job harder and more costly. The techniques described herein may strengthen cyber readiness in a contested and degraded cyber operational environment, providing a set of automated capabilities to respond dynamically to escalating threats. The techniques may include but are not limited to: employment of application execution/database transaction sandboxes to check results before actual execution, business-unit failover to change entire suites of critical processes when compromise/failure occurs.

DETAILED DESCRIPTION

A Fight-Through Node (FTN) is described, which is a hardware/software system to enhance networks with survivability properties. In some example, not all nodes in a network are equally important. In many large-scale networks, some nodes are immediately critical to success whereas other nodes play a secondary role. Network nodes that host one or more essential services may be viewed as critical nodes that may be good candidates for to utilize the techniques described herein to achieve increased resiliency to network attacks.

Figure 1:
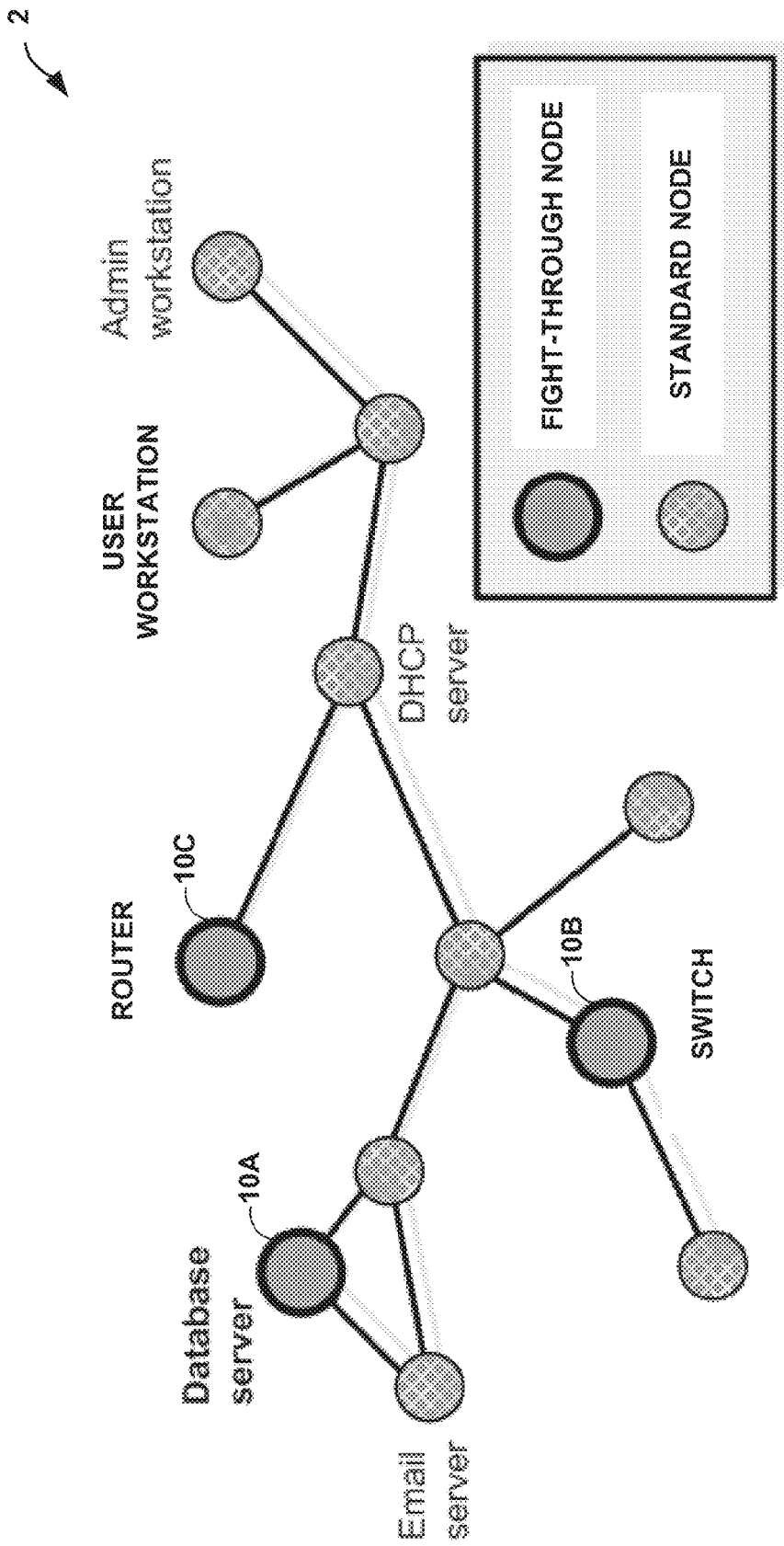
FIG. 1 is a network diagram showing an example network having fight-through nodes with survivability properties for resiliency to network attacks.

FIG. 1, for example, illustrates an example network 2 in which three nodes 10A, 10B and 10C ("nodes 10") have been identified as critical for the operation of data analysis and dissemination. Without operation of nodes 10, for example, network 2 may not be able to provide any level of service; conversely, a network with only these nodes may be able to provide at least a minimal amount of service. FIG. 1 is an example and the techniques herein may be applied to fewer or more nodes, such as all nodes within a network.

A Fight-Through Node (FTN) is described that may be used to replace nodes in a network. Networks equipped with FTNs may have increased resiliency, enabling critical processes to operate despite attacks on the node or impacts on other parts of the network. In some embodiments, an FTN is a hardware-based solution with customized software, e.g., a small rack of servers executing the software, used to replace an existing operation-critical server or workstation. In other example implementations, an FTN may be an end-user device (e.g., a client computing device) that applies the techniques described herein to provide client-side resiliency to network attacks. For example, the techniques described herein may be applied on end-user devices (e.g., laptops, workstations, mobile computing devices) to process outgoing client requests and/or service inbound requests from peer client devices, servers or other computing devices.

FTNs are resilient to attacks, operate reliably despite compromise (to a threshold level), and can be easily re-deployed after being irretrievably compromised. The methods used to achieve these capabilities may include redundancy, sandboxing, synchronization, checkpointing, and restoration. While survivable against network attacks such as denial-of-service, the FTN's design is particularly effective against more insidious host-based attacks; i.e. attacks that compromise a server or workstation.

FTN's operation captures the running state of a program (and its storage) between discrete Input/Output (I/O) transactions. The FTNs extends this transaction concept to other programs including services and types of network accesses such as sessions.

In one example, each FTN 10 contains a set of one or more processing units (e.g., blades) executing hypervisors that provide an operating environment for an ordered group of n (where n is an arbitrary number) cloned Virtual Machines (VMs). These VMs host the node's service(s) and act as transaction sandboxes. Incoming or outgoing transaction requests are dispatched to the first worker VM in this group. After each transaction completes, the next VM in the chain is synchronized with the previous one, resulting eventually in an active record of the previous n transactions. That is, only the oldest transaction in the series will have been executed on the last VM, and all n transactions of the series will have been executed on the first VM. After n transactions are complete, incoming transactions are temporarily suspended while the integrity of the VMs is checked with an Intrusion Detection System (IDS). If the VMs remain uncompromised, all VMs within the processing pipeline are backed up, or checkpointed, a control unit connected via a privileged LAN and then the next n transactions are processed by the dispatcher. If after the set of n transaction any VMs are compromised, the control unit instructs the hypervisors to automatically isolate the compromised VMs and saves their state for later forensic analysis. The control unit directs the hypervisors to immediately start replacement VMs from a warm backup, i.e., the most recent checkpoint, and insert into the processing pipeline of VMs in place of the compromised VMs. The source of the transaction that caused the compromise is (optionally) blocked at the FTN's firewall to prevent re-infection. In this way, upon detecting one or more compromised VMs, the compromised VM are isolated from the pipeline.

EXAMPLE

Suppose that, in a network without FTNs, an attacker uses a database transaction to trigger a zero-day exploit that compromises a database server and its hot standby server, which was susceptible to the same exploit because it had been mirroring transactions. The attacker, for example, may install a rootkit onto both machines, allowing the attacker to launch a variety of denial-of-service (DoS) or stealthy data-centric attacks against the data. In the conventional network, the presence of the rootkit is immediately detected, but the servers must either be taken offline for repair or allowed to run while under control of the attacker. Neither choice is acceptable.

By converting the database server to an FTN, the attack is neutralized and operations can safely continue. The compromise and rootkit are isolated within one or more of the FTN's sandbox VMs. The compromised VMs are rolled back to clean images from warm checkpoints and the FTN continues to service incoming transaction requests. The compromised VMs' disks and memory states are provided to a response team for forensic analysis, so the exploit can be characterized and the vulnerability patched. The source address of the malformed transaction is blocked at the FTN's firewall, preventing re-infection from that vector.

FTNs may provide a variety of features. As one example, the FTN may use sandbox VMs to isolate cyber attacks and prevent them from affecting other systems on the network. Meanwhile, the service offered by the FTN continues to run on unaffected VMs. The FTNs may be easily to install and deploy in existing environment. For example, one embodiment of an FTS may utilize a rack of commodity servers that can run the same software as existing servers. FTNs can therefore either replace or shadow existing transaction-based servers on networks. As another example, the FTNs may automatically respond in real-time to cyber attacks. When attacked, FTN automatically shuts down affected VMs and restores them from recent backups. It also reconfigures its internal firewall to block source of attack.

Figure 2:
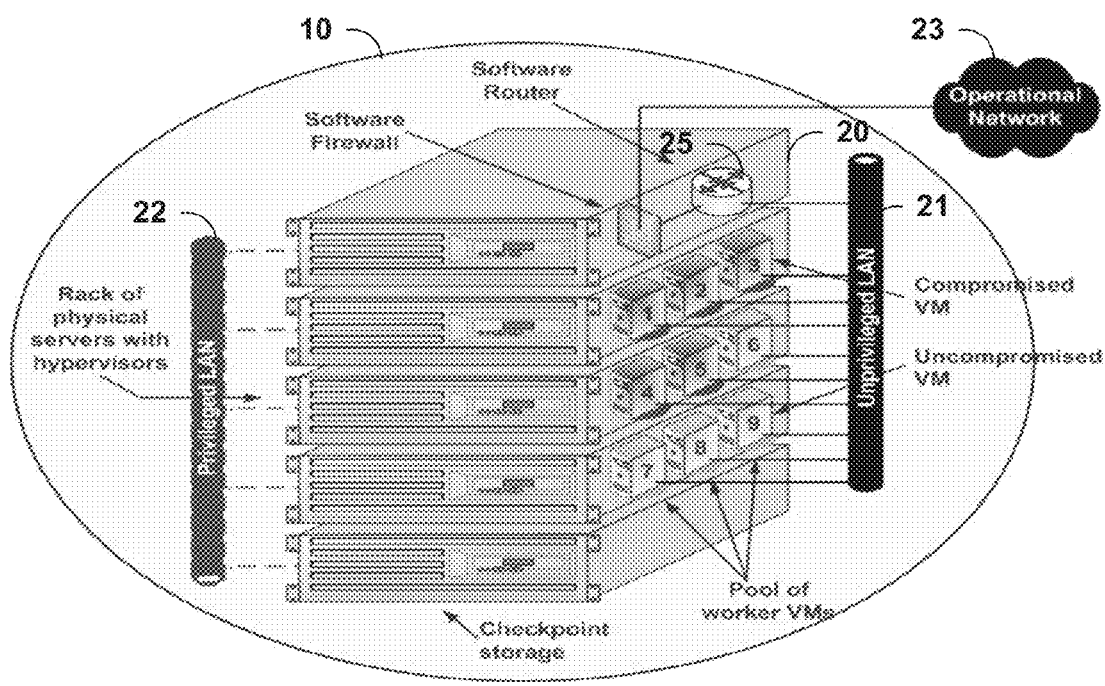
FIG. 2 is a schematic diagram illustrated in example in which, physically, a FTN is a small rack of servers connected by two networks.

FIG. 2 is a schematic diagram illustrated in example in which, physically, a FTN 10 is a small rack of servers 20 connected by two networks 21, 22. FIG. 2 illustrates the VMs hosted by a server. As shown, the FTN includes an ordered group of "worker" VMs (1-9) that execute transaction requests from the operational network. Although there are nine worker VMs shown in FIG. 2, the system can scale to provide fewer or more VMs to improve performance. The worker VMs are regularly monitored for compromise with an IDS. When they are "clean" they are backed up and when they are "dirty" (i.e., compromised) they are restored from a recent (warm) clean backup, effectively isolating and removing the compromised version of the VM from the pipeline. The FTN maintains service when attacked by verifying post-transaction integrity using VMs as sandboxes, and by eliminating compromised worker VMs and replacing them with fresh ones.

In one example, the FTN has a single address on the operational network 23. A firewall and a software router, referred to herein as a dispatcher, mediates between the worker VMs and the operational network 23. The firewall provides an adaptable first line of defense for the FTN; when an attack is detected the firewall can be automatically reconfigured to block future attacks from the same source after the worker VMs are restored. The dispatcher 25 stores and forwards transaction requests and responses. That is, dispatcher 25 forwards transaction requests from clients to the worker VMs. The dispatcher may mirror transactions across the worker VMs, but not to all workers VM simultaneously (as discussed below). Dispatcher 25 instead sequentially deploys copies of the transaction in a delayed fashion to the worker VMs so as to establish a processing pipeline of VMs working on the same transactions, e.g., from the same network communication session or from sessions with multiple clients. Dispatcher 25 forwards delayed, unified responses from the worker VMs back to clients after waiting to determine whether transactions were attacks or not (avoiding the problem of "rolling back" the clients). By forwarding transaction messages to the VMs serially, dispatcher 25 forces the VMs' services into deterministic behavior, avoiding the complication of race conditions between simultaneous requests.

There are a number of potential strategies for using the pool of sandbox VMs 1-9 to balance FTN resiliency with performance. One example is to line them up into a "processing pipeline," in which each transaction is executed on each VM but in a different time step. That is, the first transaction is executed on VM1, then during the next "time step" the first transaction is executed on VM2 while the second transaction is executed on VM1. When the first transaction in a sequence is executed on the final VM (i.e., a set of n transactions have been loaded into the queue of n VMs), all of the VMs are paused, checked for evidence of attack, and restored as needed. If none are compromised, the entire state of the set of VMs is checkpointed at the same time. This process is repeated after deploying another set of n transaction to the VMs. This pipeline approach allows the FTNs to perform the security checks and create backups less frequently (rather than after every transaction, after every n transactions where n is the number of VM workers), yet still provides a set of discrete checkpoints that are only one transaction apart so the dispatcher can "roll back" the FTN to the appropriate point.

The clean checkpoints of all VMs are stored on the checkpoint server. In one example, this host is not connected to the VMs, but rather to the hypervisors hosting the VMs on a privileged network. The FTN's critical processes (synchronization, integrity checking, checkpointing, and restoration) are executed by the hypervisors as directed by the control module, so that under normal operation (which includes "normal" attacks; i.e., attacks on processes or their operating systems) the critical processes are safe from compromise. In the unlikely event that an attacked VM escalates privilege and compromises its hypervisor, the entire FTN must be restored from a cold backup, i.e., its initial configuration. This restoration would involve swapping the hard drives of the physical servers, which requires manual intervention but can be still accomplished within minutes. The compromised hard drives would be made available to a response/forensics team for analysis.

The operation of an FTN utilizes one or more intrusion detection systems (IDSs). For the case of an attack on service availability, (a network or host-based DoS), a DoS that is not easily detectable is a rather ineffective attack and does not require resiliency. More subtle is an attack that quietly compromises a node for the purpose of stealthily exfiltrating or altering data. IDSs detecting such stealthy attacks exist, and the FTN may be used with such an IDS to detect attacks on a node's confidentiality and integrity. Because the FTN's server hypervisors may have a higher level of privilege than the VMs, IDSs executed from the hypervisors may provide FTNs with a higher level of assurance than typical IDSs executing within the VMs could achieve.

The architecture of the FTNs is configured to operate on a per transaction basis. Synchronization, checkpointing, and restoration within FTNs may be driven by breaking down I/O of a service (e.g., communication sessions such as FTP, HTTP or the like) into discrete transactions. The simplest types of transactions involve the exchange of a single pair of messages; for example a database commit request and acknowledgement of success or an HTTP GET request and content-filled response. Net-centric Service Oriented Architectures (SOAs), as well as much of the Internet at large, follow this paradigm.

Since dispatcher 25 performs synchronization using service-level transactions, it is able to define and detect transactions at the application level of the network stack. Dispatcher 25 may extract higher-level semantics from the lower layers of the stack, such as the transport layer (TCP packets). Such extraction may be protocol-specific, and possible for any discrete messaging protocol with a known specification. Messages may be sent as text (e.g., web service SOAP/XML messages) or as programmatic data structures (e.g., Java RMI data objects), and FTNs may support both.

In one example, dispatcher 25 is a transaction router executing within a VM that presents the outside network with a single interface to the FTN, accepts incoming transaction requests from clients, individually forwards them to the worker VMs in the pipeline, and sends transaction responses back to the clients. Dispatcher 25 is transaction-aware for the specific service(s) its FTN is providing. Dispatcher 25 provides a store-and-forward component for transactions that sends transaction requests to the worker VMs after each synchronization time step, and responses to clients can only be sent after the IDS verifies worker VM integrity post-transaction. The store-and-forward mechanism may occur at the application level (i.e., layer 7 and up); that is, it may accept and acknowledge the multiple TCP packets that constitute a single transaction message in accordance with the application-layer protocol. In addition, software-encrypted sessions may be handled at the application level. In this case, the dispatcher may act as a proxy, making encrypted connections with clients rather than the individual worker VMs doing so. Hardware encryption would be orthogonal, and therefore straightforward to accommodate.

When a worker VM becomes compromised, that VM and all preceding VMs in the pipeline (VMs that have executed transaction subsequent in time to the transactions executed by the compromises VM) are reconstituted. This recovery process may start with promotion of the most up-to-date "clean" VM to the front of the pipeline and proceeds with identifying which warm checkpoints to use for reconstitution.

A survivability threshold of an FTN may be applied; i.e., the level of attack and/or compromise may be determined and compared to a threshold before the FTN is taken offline and reconstituted from a cold backup.

Each FTN worker VM may have an independent disk image containing its operating system and services. For nodes requiring large amounts of data storage, the worker VMs may be connected to a single storage array. A trade-off must be made between resources and security for these types of nodes. A centralized storage may save on hardware, space, and power requirements, but may only protect against compromise of the VMs' OS and processes. This still presents considerable protection because it severely limits the actions an attacker can take. Alternatively, data storage may be replicated on independent disks for all VMs, which requires more resources but provides additional protection against data corruption and theft. In this case, checkpointing may occur for each VMs' disk space.

The system may be configurable between the number of worker VMs and the frequency of integrity checks. This allows an administrator to manage the trade-off between resources and performance. The factors affecting performance include (1) the time between periodic IDS checks/checkpointing, (2) the processing time required for the IDS checks/checkpointing, and (3) the transaction latency introduced by the depth of the worker VM pipeline. More worker VMs improves performance in the first two cases, but degrades it in the third case. In all cases, additional VMs require additional hardware, space, and power.

In addition, an administrator may configure a level of the IDS checks (security) so as to control the time requirement for the integrity checks (performance). At the simplest level, the IDS may be configured to only checks for DoS attacks by verifying that the VM's critical service is still running and available; this would be a quick check. At a higher level, the IDS may be configured to look for malware in the VM's RAM or disk; this would take longer but defend against more subtle threats.

In some embodiment, dispatcher 25 may include functionality of an Application-Level Gateway (ALG) that operates at the network layer. That is, an ALG is a type of proxy that dynamically helps certain applications work through firewalls and NAT connections. To do this, the ALG understands the protocols used by the applications it supports. It may perform deep packet inspection to set up ephemeral ports, routes, and connections based on the incoming protocol being used.

The FTN dispatcher 25 may extend the functionality of the ALG by supporting simple text protocols such as HTTP and FTP but also a variety of protocols. The dispatcher may set up connections between clients and servers, and also extract, store, and forward transaction messages itself rather than simply set up connections for pass-through communications. Finally, to support protocols that can only be understood at the session or application layer, the FTN dispatcher may operate as a proxy, making its own connections to both the client and server.

For example, to handle encrypted (SSL) sessions by tunneling the connection, or by using the SOCKS protocol [http://tools.ietf.org/search/rfc1928], dispatcher 25 may operate as a proxy. In this case, dispatcher 25 may be provided a server key for the worker VMs and make the connection to clients. It could then either forward the encrypted packets, or create decrypted (plaintext) packets to forward to the worker VMs.

In one example, the dispatcher serializes transactions to a single pipeline of VMs to simplify synchronization. Alternatively, the dispatcher may parallelize some types of transactions (e.g., read-only transactions)

The worker VMs are backed up, or checkpointed, after the periodic IDS scans. The VM's memory and disk image may be written to files. In some cases, much of a VM's RAM may already stored on disk in swap space, and Copy-on-Write (CoW) disk images only store the differences between a file system's shutdown state and its active one. These two factors may be used to reduce the time required to create a checkpoint.

A simple write of VM state as described above is called a "discard" checkpoint. Periodically the FTN could perform "merge" snapshots, which merge the CoW differences from a discard snapshot to a previous snapshot or the original disk image. This would reduce the number of stored snapshots. Another alternative is to just throw away discard snapshots as they age, but this may cause discontinuities in live data. The types of snapshots available and their age could be primary factors in determining which snapshots to restore after one or more worker VMs are compromised.

VMs may become compromised yet remain undetected for an extended period. To address this problem, VMs could be periodically restored from a cold, but known to be clean, backup. This technique is called proactive recovery. Such a technique may be simpler to implement in the case where worker VMs all tie in to a common database; the VMs could be refreshed without disrupting the results of their transactions. This technique would be more difficult to apply, when all VMs and their storage is fully replicated, without losing the database's state changes.

In one example, FTNs are used with respect to application-level database transactions using a distributed storage model; that is, each worker VM in the FTN has its own database. The FTN's internal state can be synchronized with that of the operational network on which it resides, and the FTN can recover from a host-based denial of service attack.

Figure 3:
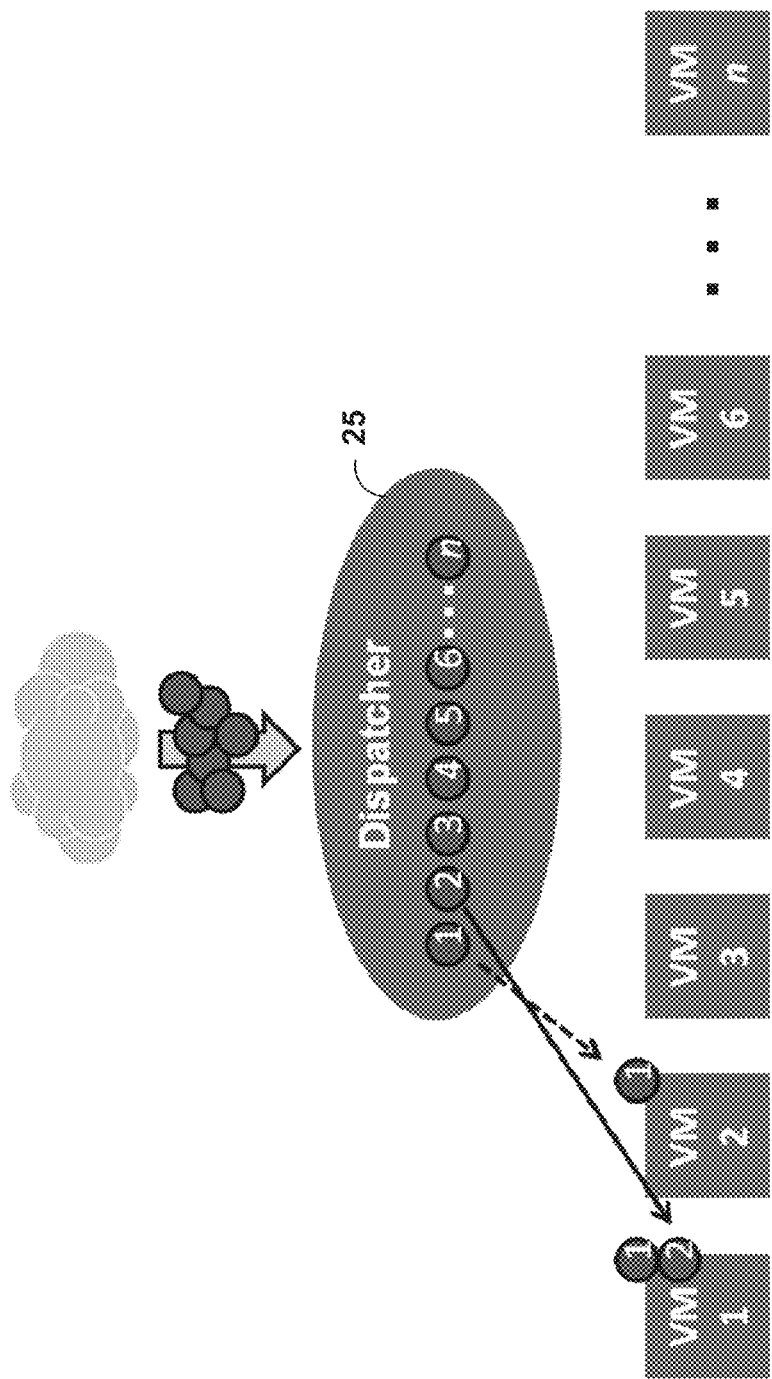
FIG. 3 is a diagram illustrating a dispatcher within a FTN dispatching initial incoming transaction requests (#1, #2) to a first few worker VMs (1, 2) in a group of n virtual machines.

FIG. 3 is a diagram illustrating dispatcher 25 dispatching initial incoming transaction requests (#1, #2) to the first two worker VMs (1, 2) in a group of n virtual machines. For example, during a first time step transaction #1 from network communications may be dispatched to the first VM in the group. During the second time step, the first transaction is dispatched to a second VM and a second transaction for the network communications serviced by the FTN is dispatched to the first VM, as shown in FIG. 3. In this way transactions for the multiple communication session may be serialized and deployed to the VMs in a pipelined fashion.

Figure 4:
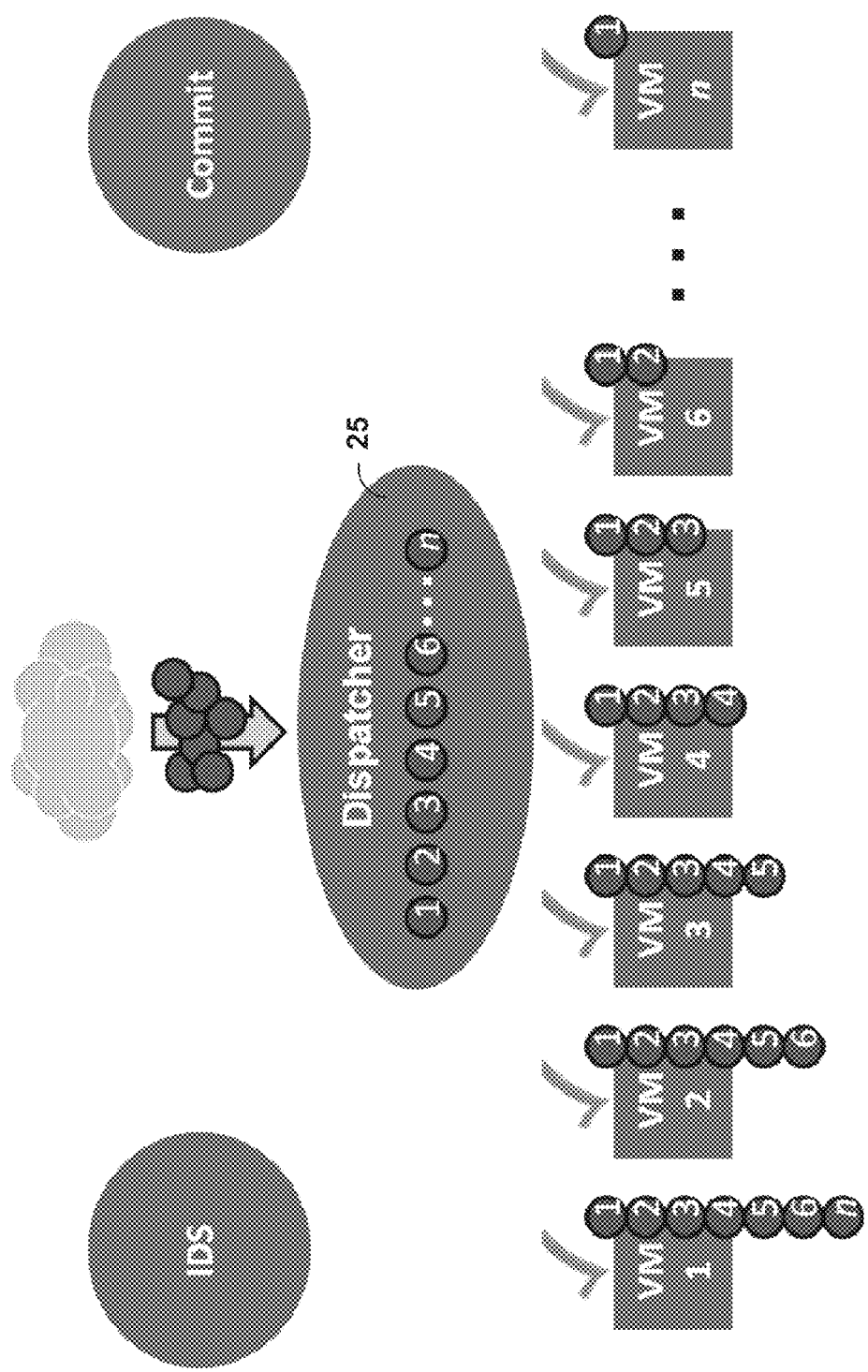
FIG. 4 is a diagram illustrating a subsequent state of the pipeline of VMs where the dispatcher has deployed n incoming transaction requests (#1–#n) over n timesteps to the set of VMs (1–n) so as to form a fully loaded pipeline of virtual machines.

FIG. 4 is a diagram illustrating a subsequent state of the pipeline of VMs where dispatcher 25 has deployed n incoming transaction requests (#1–#n) over n timesteps to the set of VMs (1–n) so as to form a fully loaded pipeline of virtual machines. At this point, all of the VMs are paused and validated with IDS checks for evidence of attack. In this example, no attack is detected (shown by checkmarks) and the full set of virtual machines is checkpointed at once.

Figure 5:
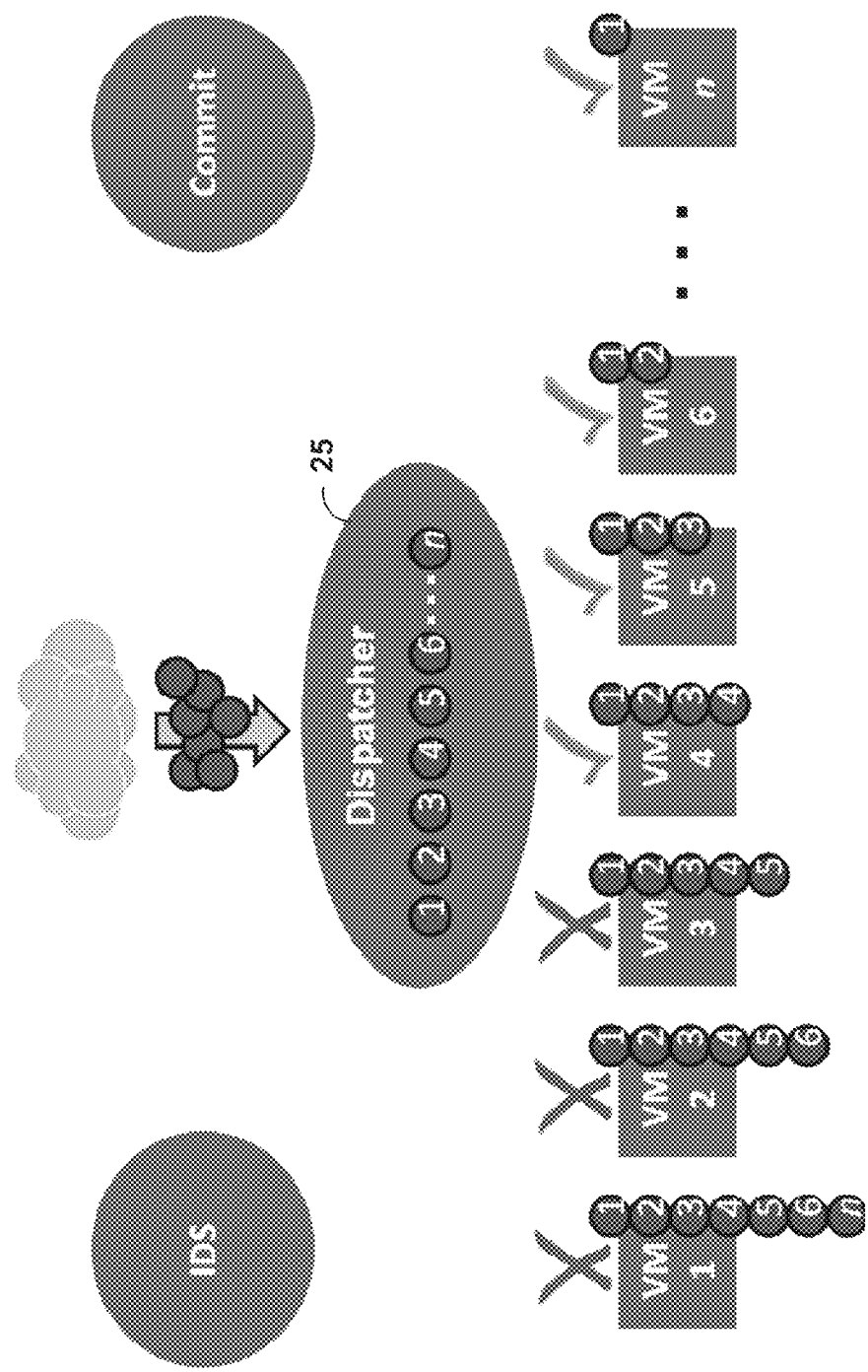
FIG. 5 is a diagram illustrating a subsequent state of the pipeline of VMs where the dispatcher has deployed a second set of n incoming transaction requests (#1–#n) over a second n timesteps to the set of VMs (1–n). In this example, VMs 1-3 are determined to be in a compromised state.

FIG. 5 is a diagram illustrating a subsequent state of the pipeline of VMs where dispatcher 25 has deployed a second set of n incoming transaction requests (#1–#n) over a second n timesteps to the set of VMs (1–n). In this example, VMs 1-3 are determined to be in a compromised state.

Figure 6:
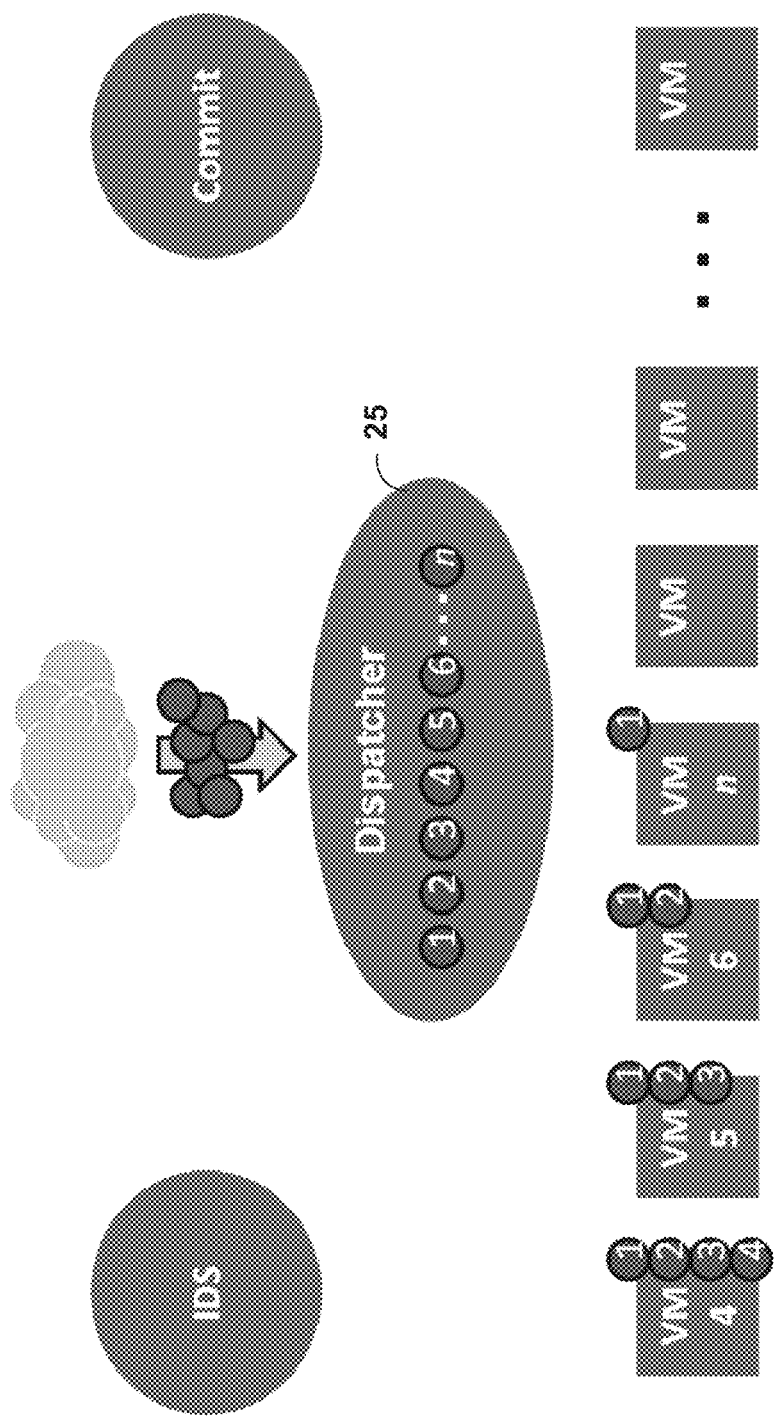
FIG. 6 is a diagram illustrating a subsequent state in which the compromised VMs 1-3 have been removed from the front-end of the pipeline.

FIG. 6 is a diagram illustrating a subsequent state in which the compromised VMs 1-3 have been removed from the front-end of the pipeline. Remaining VMS 4-n are promoted to earlier stages of the pipeline and new VMs are created at the tail end of the pipeline to once again form a pipeline of n VMs. The new VMs may be instantiated by the hypervisor and initialized with a most recent checkpointed state to ensure consistency. Compromised VMs 1-3 may be automatically isolated and their state saved for later forensic analysis of VMs.

Figure 7:
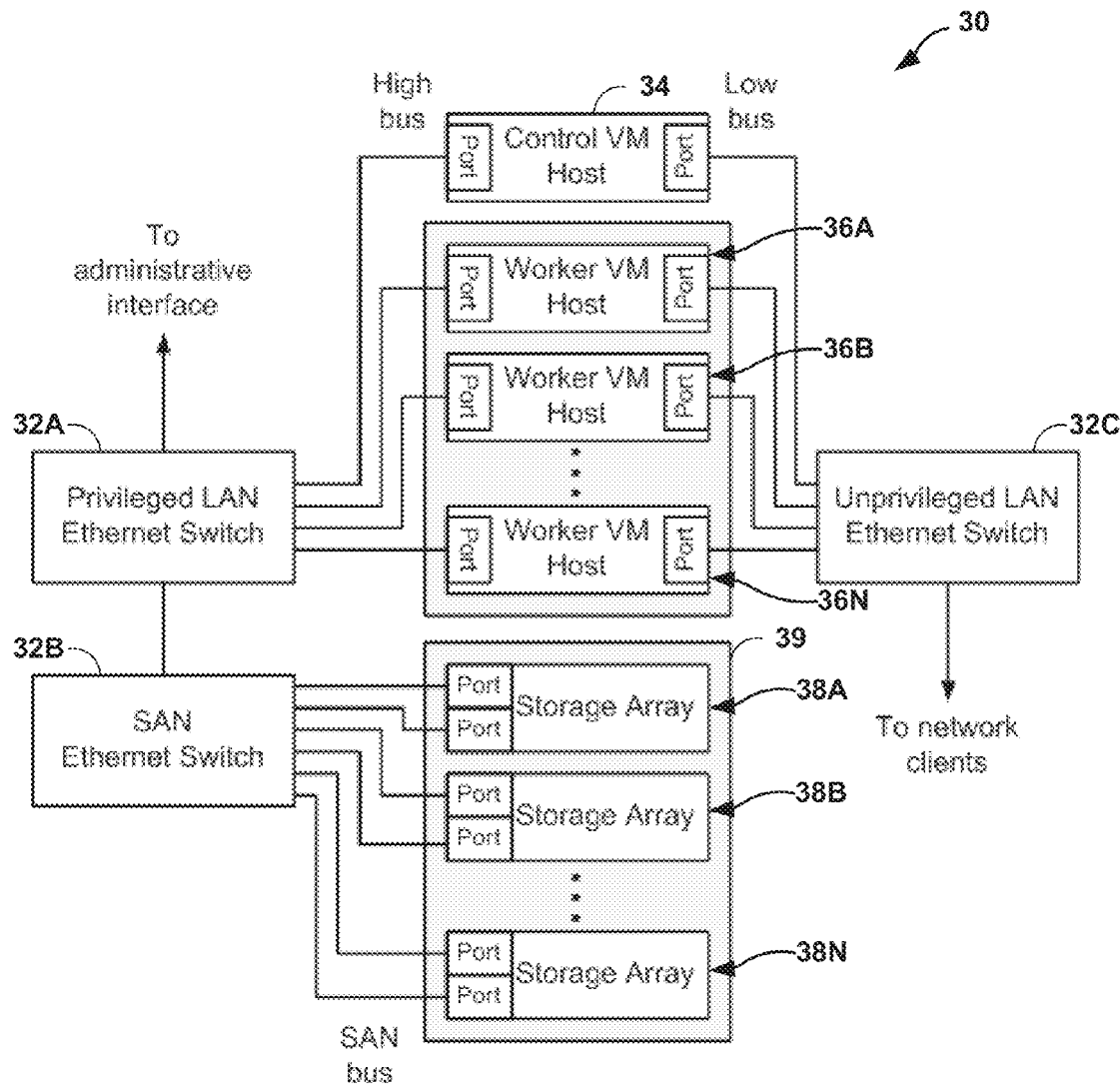
FIG. 7 is a block diagram illustrating an example FTN hardware architecture.

FIG. 7 is a block diagram illustrating an example FTN hardware architecture 30. In some examples, FTNs may utilize three general categories of hardware: rack-mounted servers with virtualization support, rack-mounted storage arrays, and Ethernet switches. In such examples, the servers may include two general categories: a single host for the control VM (e.g., control VM host 34) and one or more hosts for worker VMs. In the example of FIG. 7, FTN hardware architecture 30 includes a group of worker VM hosts 36A, 36B, and 36N, collectively referred to herein as "worker VM hosts 36." One or more storage arrays may be connected to form storage area network (SAN) 39. For instance, as illustrated in FIG. 7, SAN 39 includes storage arrays 38A, 38B, and 38N, collectively referred to herein as "storage arrays 38." Privileged LAN Ethernet switch 32A, SAN Ethernet switch 32B, and unprivileged LAN Ethernet switch 32C, collectively referred to herein as "Ethernet switches 32," provide network connectivity for three separate communications busses: an unprivileged (low) bus, a privileged (high) bus, and a SAN bus.

FTN hardware architecture 30 may utilize commercially-available (i.e., commodity) hardware, thereby facilitating installation and deployment of the FTN. For instance, because FTNs may utilize such commodity hardware, the FTN may be implemented without the need for specially-designed hardware. Moreover, each of the three hardware types utilized by the FTN (e.g., servers, storage arrays, and switches) may be homogenous, thereby facilitating configuration and replacement of the hardware devices. For instance, control VM host 34 and each of worker VM hosts 36 may be the same type of server device. Similarly, each of Ethernet switches 32 may be the same type of Ethernet switch, and each of storage arrays 38 may be the same type of storage array.

Control VM host 34 and worker VM hosts 36 execute each execute hypervisors that provide an operating environment for one or more privileged and unprivileged VMs. A privileged VM has access to the hypervisor, whereas an unprivileged VM does not. Control VM host 34 executes an unprivileged VM including three of the principal software components of the FTN: a software firewall, dispatcher, and accumulator (discussed in further detail below). Each of the worker VM hosts 36 executes one or more unprivileged VMs that form the worker pool for processing client transactions. In addition, each of the worker VM hosts 36 executes a privileged VM.

As illustrated, control VM host 34 and each of worker VM hosts 36 connect to the high and low busses utilizing a separate network port for each bus. The low bus ports are connected directly to each host's unprivileged VMs, which process client transactions that may potentially compromise the integrity of the VM. The high bus ports are connected to each host's privileged VMs, which execute the command and control communications of the FTN. One exception is the unprivileged VM executing on control VM host 34, which is connected to both the privileged (high) and unprivileged (low) busses to enable the VM to process client transaction information as well as synchronize with the software components on the high bus. Safeguards may be implemented to protect the integrity of this VM and prevent cross-communication between the privileged and unprivileged networks.

SAN 39 includes storage arrays 38, each of which includes one or more hard drives and software to interface with other storage arrays. To increase network I/O, each of storage arrays 38 include two memory controllers. Each of the two memory controllers includes a dedicated network port connected to the SAN bus via SAN Ethernet switch 32B. SAN Ethernet switch 32B provides a single interface for SAN 39 to the high bus via privileged LAN Ethernet switch 32A, such as by using the internet Small Computer System Interface (iSCSI) network storage protocol.

A FTN may use SAN 39 for both long-term archiving of VM checkpoints and centralized storage of shared software used by worker VM hosts 36, such as the checkpointing and validation modules (described below). SAN 39 enables management of VM checkpoints at the block level using Logical Volume Management (LVM).

Figure 8:
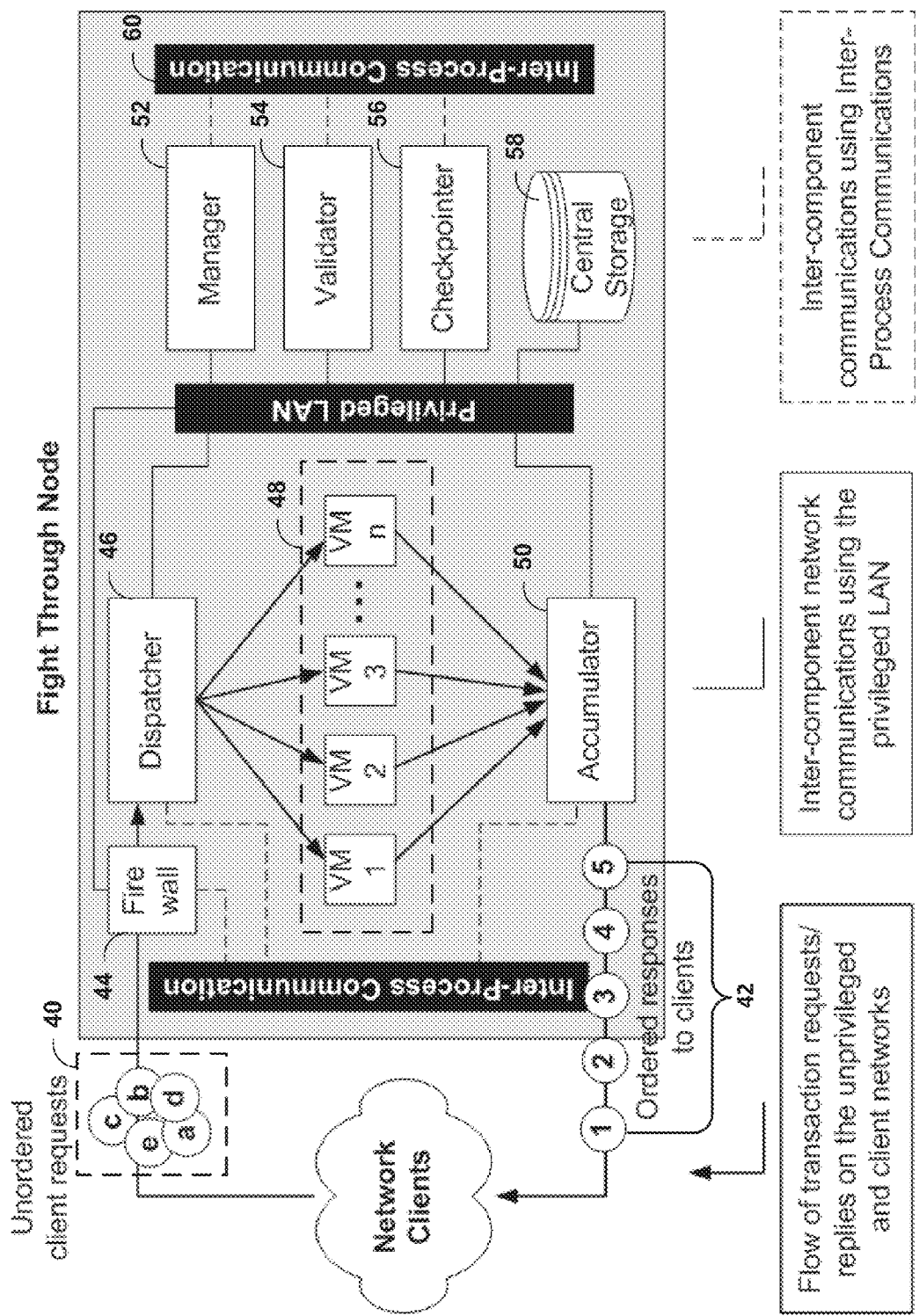
FIG. 8 is a block diagram illustrating an example FTN architecture.

FIG. 8 is a block diagram illustrating an example FTN architecture. As illustrated in FIG. 8, an example FTN architecture includes firewall 44, dispatcher 46, worker VMs 48, accumulator 50, manager 52, validator 54, checkpointer 56, and central storage 58. In some examples, firewall 44, dispatcher 46, worker VMs 48, and accumulator 50 are all hosted by unprivileged VMs (i.e., VMs without access to the hypervisor executing on one or more processors to provide an operating environment for the VM), and are connected to an unprivileged LAN over which client transactions are communicated. Network communications over the unprivileged LAN may be considered potentially dangerous. That is, network communications over the unprivileged LAN may include data or other communications that may potentially compromise the integrity of the VMs, such as worker VMs 48 or other VMs associated with the FTN. As illustrated in FIG. 8, Firewall 44, dispatcher 46, and accumulator 50 are also connected to privileged LAN 51 for command and control messaging.

The FTN uses inter-process communications (IPC) and network communications on privileged LAN 51 to synchronize each of the components of the FTN. Because firewall 44, dispatcher 46, and accumulator 50 may be hosted by a single VM, they may exchange synchronization communications using IPC. Components located on different VMs or different physical hosts exchange synchronization communications using privileged LAN 51.

In one example implementation, synchronization messages may be passed between components using a two-level communications protocol. Low-level message passing primitives support high-level messages by managing communication channels and transmitting the high-level messages. The primitives may be used for both network communications and IPC to make communications substrate transparent. As one example, five primitive operations include: LISTEN, LINK, WRITE_LINK, READ_LINK, and BREAK_LINK. The five primitive operations may be used to: open a receiver's end of a channel, open a sender's end of a channel, place a message in the receiver's message queue, fetch a message from the receiver's message queue, and terminate the channel (from either end).

As an example, five high-level message types that may be exchanged using the low-level messaging primitives include: queries, status updates including unsolicited updates or responses to queries, commands, errors, and interrupts. Examples of queries include, but are not limited to, "verify VM x is running," "verify service is ready," and "verify component x operation." Examples of status updates include, but are not limited to, "VM x is running," "VM x is ready for requests," "component x is running," "all VMs are running," "all VMs are ready for requests," "VMx ready for connection," "VM x ready for validation/checkpointing," "VM x validated/checkpointed," "VM x archived," "VM x checkpoint y is located at z," "VM x loaded onto host y," "logical VM ordering is . . . ," and "VM network addresses are . . . ." Examples of commands include, but are not limited to, "start VM x using image y," "load VM x onto host y," "add firewall rule x," "pause/unpause VM x," "verify/checkpoint VM x," "archive VM x checkpoint y," "shut down/destroy VM x," and "start/stop/reset component x." Examples of errors and exceptions include, but are not limited to, "timeout," "null pointer," "resource does not exist," and "insufficient permission." Examples of interrupts and faults include, but are not limited to, "segmentation fault," and "user interrupts."

Manager 52, validator 54 and checkpointer 56 are hosted by privileged VMs (i.e., VMs with access to the hypervisor), and are connected to privileged LAN 51. Central storage 58 is also connected to privileged LAN 51, but is not hosted by a VM in the example of FIG. 8. Network communications over privileged LAN 51 may be considered secure, and are used for command and control communications, including for system administration.

In some examples, transaction processing is accomplished in a loop using the unprivileged LAN between network clients 41, firewall 44, dispatcher 46, worker VMs 48, and accumulator 50. As illustrated in FIG. 8, dispatcher 46 receives unordered client requests 40 via firewall 44. In response, dispatcher 46 processes the unordered requests and inserts them into an ordered queue that is forwarded to the worker VMs 48 (i.e., the worker VM pipeline). Dispatcher 46 may, in certain examples, be implemented using a plugin architecture, thereby enabling support for multiple network protocols using separate modules for distinct protocols. Such a plugin architecture may enable an FTN to support any combination of protocols for which plugins exist.

As one example, the dispatcher may sequentially deploy copies of the transaction in a delayed fashion to the worker VMs so as to establish a processing pipeline of VMs working on the same transactions according to the following operational algorithm: (1) listen to firewall 44 for incoming unordered client transaction requests 40, (2) receive unordered incoming client transaction requests 40 from firewall 44, (3) parse unordered client requests 40 into discrete transactions, (4) order the discrete transaction requests and insert the ordered transaction requests into an ordered queue, (5) wait for at least one of accumulator 50, manager 52, or checkpointer 56 to indicate that the next VM of worker VMs 48 is ready to receive new requests, (6) remove the request from the ordered queue, (7) forward the request to the next worker VM in the pool of available worker VMs 48, and (8) record the request to a log (e.g., for later recovery or forensic analysis). The dispatcher repeats the operational algorithm (i.e., loops through operations 1-8) until the worker VM pool 48 is full. In response to determining that the VM pool is full, the dispatcher signals validator 54 (e.g., using privileged LAN 51) that the integrity of a VM of worker VMs 48 is ready to be checked and continues to repeat the operational algorithm.

In the example of FIG. 8, accumulator 50 receives transaction results from worker VMs 48 and stores them until the integrity of the VMs has been checked. If the VMs remain uncompromised, accumulator 50 forwards the unified responses from worker VMs 48 back to network clients 41 (e.g., using the unprivileged LAN). As one example, accumulator 50 may operate according to the following operational algorithm: (1) connect to unpaused VMs when signaled by at least one of manager 52 or checkpointer 56, (2) listen for VM transaction results from clients, (3) wait for transaction results from worker VMs 48, (4) receive one or more transaction results from worker VMs 48, (5) parse the received VM transaction results into discrete transactions, and (6) insert non-duplicate results in an ordered queue. Accumulator 50 repeats the operational algorithm until accumulator 50 receives an indication from validator 54 that the integrity of a VM of worker VMs 48 has been checked. In response to receiving the indication from validator 54, accumulator 50 removes the requests from the queue, forwards the unified responses from worker VMs 48 back to network clients 41, records the results to a log, and continues to repeat the operational algorithm.

Worker VMs 48 receive client transaction requests from dispatcher 46, process the requests, and forward the results to accumulator 50. For instance, a worker VM may operate according to the following operational algorithm: (1) receive a start or unpause command from one or more of manager 52 or checkpointer 56 via the hypervisor, (2) wait for verification of a readiness status request from manager 52, (3) reply to the readiness status request received from manager 52, (4) wait for a client request from dispatcher 46, (5) receive a client request from dispatcher 46, (6) process the received request, (7) forward the transaction results to accumulator 50, and (8) signal dispatcher 46 that the worker VM is ready to receive a new client request. The worker VM repeats operations (4) through (8) of the operational algorithm until the pool of worker VMs 48 is full. When the pool of worker VMs 48 is full, validator 54 pauses the worker VMs to check the integrity of worker VMs 48 (described below). If the VMs remain uncompromised, all VMs within the worker VM pipeline 48 are backed up, or checkpointed. After checkpointing is complete, worker VMs 48 are unpaused and continue to operate according to the operational algorithm beginning from operation (1) of the algorithm.

In the example of FIG. 8, manager 52 is hosted by a privileged VM executing on a control VM host (e.g., control VM host 34 of FIG. 7). Manager 52 coordinates overall FTN execution by synchronizing the other FTN components in various operational modes, including recovery mode. Example operations of manager 52 include, but are not limited to: coordinating initialization and boot-up of the FTN system; initialization of other components included in the FTN; setting up the pool of worker VMs upon system startup, full condition, or during recovery; verifying when the worker VM pool is ready to receive transaction request; informing other components of the FTN of the logical ordering and network addresses of the worker VMs; handling faults, errors, exceptions, and interrupts; coordinating the recovery process among other components of the FTN; disassembling the worker VM pool upon system shutdown, full condition, or during recovery; coordinating system shutdown; and monitoring the unprivileged control VM for compromise. In addition, the run state of worker VMs may be controlled by manager 52 via the hypervisor. Manager 52 may include a user interface (UI) to enable administrators to configure, control, and monitor the status of the FTN. As one example, a UI provides one or more controls (e.g., knobs, buttons, sliders, and the like) to enable an administrator to vary parameters associated with the FTN, such as the number of VMs included in the worker VM pool, how many transactions to dispatch simultaneously, etc. Such parameters may enable an administrator to fine-tune and balance certain aspects of the FTN, such the level of security, performance characteristics (e.g., transaction latency), and the like.

Validator 54 checks the integrity of the VMs with an Intrusion Detection System (IDS). For example, validator 54 may check each VM using a host-based IDS (HIDS). In such an example, the integrity of each VM is checked using the HIDS and network intrusion detection is handled using firewall 44.

In some examples, the HIDS may execute in the background of the host VM and intercede when a compromise is detected (e.g., a "stack canary," which may detect buffer overflow attacks). This type of system may decrease the execution time of the HIDS, thereby reducing latency introduced when checking the integrity of VMs. As another example, the HIDS may monitor access control. Examples of such a HIDS include SE Linux which may detect unprivileged access attempts on system resources, and system call wrappers which may be used to monitor resource usage by executing processes. As yet another example, the HIDS may include a file system integrity checker that scans each file of interest. Such file system integrity checker HIDS systems may scan each file, or only those that have been modified during the previous execution step of the VM. Agent HIDS may interface with validator 54 using the unprivileged LAN. Validator 54 may then communicate with other components of the FTN regarding the integrity of the VMs using privileged communication channels.

Validator 54 checks the integrity of worker VMs 48 between transactions. Results from validator 54 may be used to automatically reconfigure firewall 44. For instance, the source of the transaction that caused the compromise may be optionally blocked at firewall 44 to prevent re-infection. As one example, validator 54 may operate according to the following operational algorithm: (1) wait for dispatcher 46 to signal that a VM is ready to be validated, (2) pause the VM (optionally, depending upon the specific agent HIDS), (3) check the integrity of the VM using the HIDS, such as by executing the HIDS and requesting results from the HIDS agent if the HIDS is not a real-time HIDS, (4) signal checkpointer 56 when a VM has been checked and is determined to be uncompromised, and (5) enter the checkpoint results into a log (such as for later forensic analysis). The validator may continue to operate according to the operational algorithm by looping through the algorithm beginning from operation (1).

In some examples, multiple HIDS agents may be executed for validation. For instance, one or more of a first class of agents may monitor the kernel, one or more of a second class of HIDS agents may monitor executing processes, and one or more of a third class of HIDS agents may monitor data structures in memory or on disk. The type of HIDS select may depend upon the server the FTN is running. For instance, a database FTN may use a HIDS agent to monitor the integrity of database tables.

In certain examples, a HIDS may be unable to ascertain the time or cause of a compromise, possibly due to a delay between the time of attack (TOA) and the time of detection (TOD). As another example, some attacks may not be atomic. That is, some attacks may take a number of time steps to complete. To account for such time delays or non-atomic attacks, a configurable parameter may be set to enable the FTN to roll back an arbitrary number of transactions. The ability to roll back to an arbitrary point may provide flexibility in recovering from attacks that are not atomic or were detected after a period of time. The roll back parameter may be tuned for one or more of the type of IDS used by the FTN or the type of compromises detectable by the IDS.

Other virtual machines, such as virtual machines preceding the compromised virtual machines in the pipeline, may also be isolated. This may provide an ability to roll back to an arbitrary point, which may provide flexibility in recovering from attacks that are not atomic, e.g., attacks that took a number of time steps to complete.

In certain examples, rather than using HIDS executing on the VMs, validator 54 may utilize Virtual Machine Introspection (VMI). By utilizing VMI, validator 54 may examine the state of a VM via the hypervisor over which the VM executes. The VMI-based validation may improve validation accuracy because it may not be detectable by software executing on the VM, and it may not be hidden by rootkits.

Checkpointer 56 checkpoints the processing pipeline of virtual machines (e.g., worker VMs 48) by recording a state for each of the plurality of virtual machines. Checkpointer 56 may save the state of VMs operating at one or more levels, such as at one or more of the hardware-level, operating system-level, or application-level. Checkpointing hardware-level VMs involves saving the state of the VM's disk and RAM to the host's disk. Operating system-level VMs are a lighter-weight abstraction that may enable checkpointer 56 to save only the RAM used by the VM, rather than save unused RAM to the disk of the VM host. In some examples, Checkpointer 56 may checkpoint application-level VMs by patching a kernel or instrumenting a scripted or interpreted programming language such as Python or Java. Such application checkpointing may help to defend against process-hijacking attacks.

In certain examples, the time for checkpointer 56 to record a state for each of the plurality of virtual machines may be decreased by using a relatively small micro-kernal, such as Damn Small Linux (DSL) and installing only the applications and libraries used to perform the various operations of the FTN. In addition, the time for checkpointer 56 to record a state for each of the plurality of virtual machines may be decreased by reducing the amount of RAM allocated to the VM, thereby reducing the time to write the associated RAM to the disk of the VM host. Further, checkpoint speed may be optimized by utilizing a hard drive of the VM host that uses solid state drive (SSD) memory because SSD memory may typically perform sequential write operations much faster than a traditional hard drive.

As one example, checkpointer 56 may operate according to the following operational algorithm: (1) wait for validator 54 to signal when a VM is ready to be checkpointed, (2) pause the VM if the VM has not been paused by Validator 54, (3) checkpoint the VM by recording the state of the VM to the hard disk of the local VM host, (4) unpause the VM, and (5) notify accumulator 50 and manager 52 when the VM has been checkpointed. Checkpointer 56 may continue to operate according to the operational algorithm by looping through the algorithm beginning from operation (1). In addition, checkpointer 56 may periodically record VM checkpoints to long-term SAN storage (e.g., SAN 39 of FIG. 7).

Checkpointer 56 may periodically archive VM checkpoints to Central storage 58, thereby helping to ensure that the disks of the local VM hosts do not fill up. Central storage 58, in some examples, includes a hardware SAN (e.g., SAN 39 of FIG. 7) and one or more modules executable to coordinate checkpoint management. As an example, the checkpoint management algorithm may delete checkpoints from central storage 58 at exponentially increasing time intervals. For instance, the checkpoint management algorithm may cause central storage 58 to store every one of the latest one thousand checkpoints, one in ten of the most recent ten thousand checkpoints, one in one hundred of the most recent one hundred thousand checkpoints, and so on. Such an algorithm may allow for farther roll-back at the expense of granularity of stored checkpoints.

When validator 54 determines that one or more of worker VMs 48 is compromised, the FTN components enter a recovery mode of operation. As an example, the FTN-wide recovery mode of operation may operate according to the following operational algorithm: (1) validator 54 notifies other components of the FTN that a VM is compromised, (2) FTN components cease regular operation (e.g., accumulator 50 does not forward the response to the hostile transaction to network clients 41), (3) manager 52 pauses each of the plurality of worker VMs 48, (4) manager 52 signals checkpointer 56 to record the state of each of worker VMs 48 (in parallel) for forensic analysis, (5) manager 52 requests the hostile transaction request from dispatcher 46 and forwards it to firewall 44, (6) firewall 44 uses the hostile transaction to reconfigure to prevent further attacks from that vector, (7) dispatcher 46 continues to accept and buffer incoming client transaction requests, (8) manager 52 removes those worker VMs that have processed the hostile transaction from the active pool of worker VMs, (9), manager 52 promotes the set of last known uncompromised VMs to earlier stages of the worker VM pipeline, (10) manager 52 creates new VMs at the tail end of the pipeline to once again form a pipeline of n VMs, and (11) manager 52 notifies other components of the FTN to resume normal operation.

Firewall 44 may reconfigure itself after a restoration to prevent future attacks from the same vector. Firewall 44 may be signature-based, rather than anomaly-based, to help reduce false positives. Firewall 44 may include two enforcement engines: an IP-level packet inspection to analyze packet headers, and deep packet inspection to analyze packet data. In addition firewall 44 may include algorithms to process hostile transactions (as determined by validator 54) to produce firewall policies for blocking similar future transactions. For example, such policies may include blocking the attacker's IP or IP block, and performing deep packet inspection to isolate the data sent to the FTN's service and creating a signature for blocking similar requests.

The predicted efficiency of an FTN in comparison to a standard server may be estimated by the following mathematical model equation:

$$e = \frac{T*n}{(T*n) + V + C} \quad \text{Equation 1}$$

where "e" is the efficiency of the FTN, "T" is the average round trip time of a transaction, "n" is the number of worker VMs in the pool, "V" is the time to validate a VM, and "C" is the time to checkpoint a VM.

Figure 9:
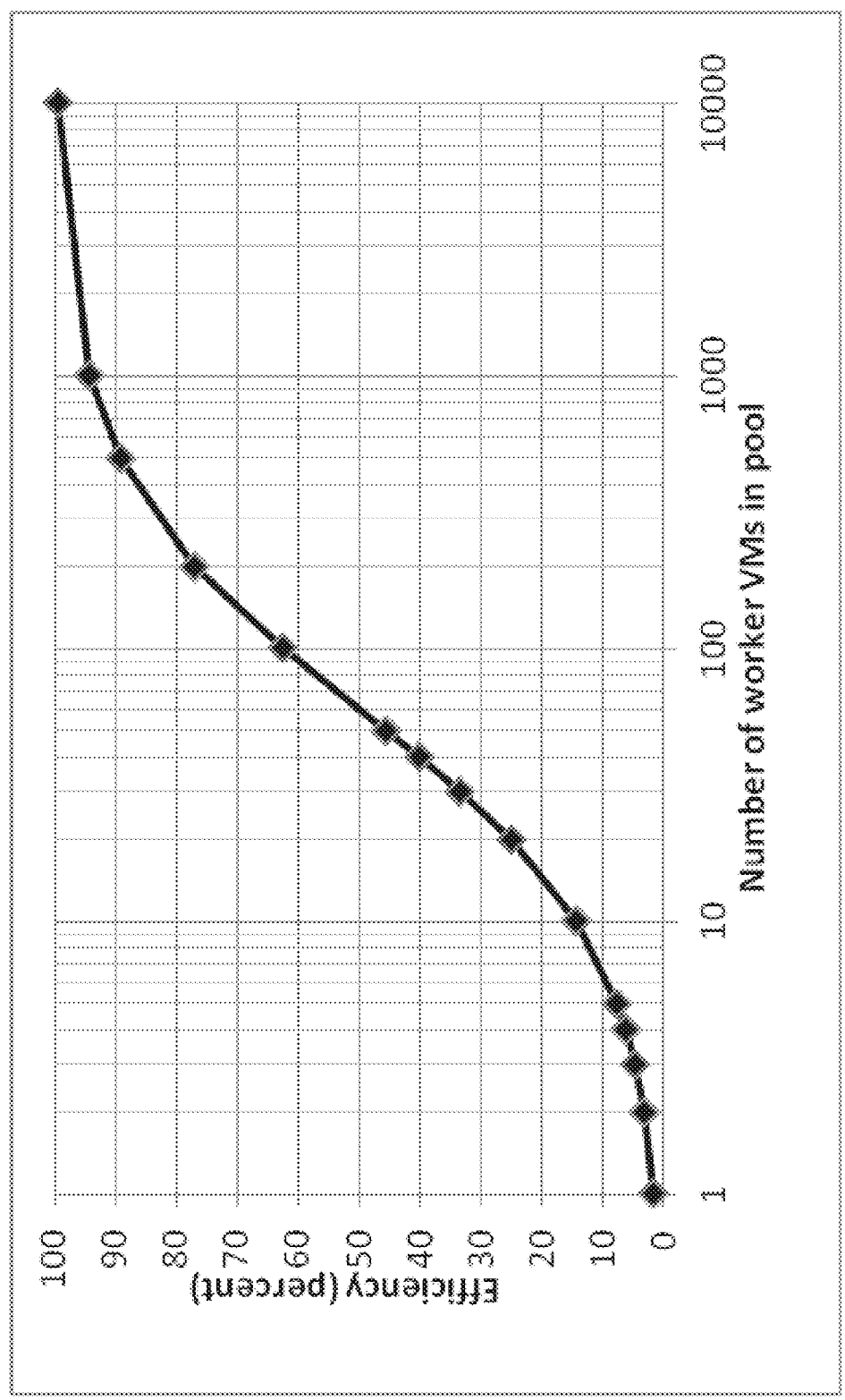
FIG. 9 illustrates a graph of a predicted efficiency of an FTN versus the size of the worker VM pool according to a mathematical model using an assumed set of constraints.

FIG. 9 illustrates a graph of a predicted efficiency of an FTN versus the size of the worker VM pool according to Equation 1 using the following constant values: "T=0.1 seconds," "V=1 second," and "C=5 seconds."

In general, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a non-transitory computer-readable medium to store instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The program code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein, including one or more hardware-based microprocessors.

Various embodiments of the invention have been described. These and other embodiments are within the scope of the following claims.

The invention claimed is:

1. A method comprising:
    receiving a plurality of transaction requests associated with one or more network communication sessions;
    distributing copies of the transaction requests to a plurality of virtual machines over a plurality of time steps to form a processing pipeline of the virtual machines;
    upon dispatching a threshold number (n) of the transaction requests to the plurality of virtual machines, detecting whether any of the virtual machines in the processing pipeline has been compromised;
    when none of the virtual machines in the processing pipeline has been compromised, check-pointing the processing pipeline of virtual machines by recording a state for each of the plurality of virtual machines;
    when at least one of the virtual machines in the processing pipeline has been compromised, removing the compromised virtual machines from the processing pipeline; and
    reordering the processing pipeline by promoting the non-compromised virtual machines to earlier stages in the processing pipeline that correspond to stages associated with the removed virtual machines that have been compromised.

2. The method of claim 1, further comprising, instantiating new virtual machines and assigning the new virtual machines within stages previously associated with the non-compromised virtual machines that have been promoted to earlier stages in the processing pipeline.

3. The method of claim 2, further comprising initializing the new virtual machines to a state previously recorded when checkpointing the processing pipeline.

4. The method of claim 1, wherein receiving a plurality of transaction requests comprises receiving, with a server, a plurality inbound transaction requests from one or more client devices.

5. The method of claim 1,
    wherein receiving a plurality of transaction requests comprises receiving a plurality outbound transaction requests from application software executing on a client device; and
    wherein distributing copies of the transaction requests to a plurality of virtual machines comprises distributing copies of the transaction requests to a plurality of virtual machines executing on the client device.

6. The method of claim 1, further comprising:
    executing each of the transactions on each of the virtual machines; and
    for each of the virtual machines, after execution of each transaction, synchronizing resultant state data from the virtual machine to a subsequent one of the virtual machines in the processing pipelines of virtual machines.

7. A network node comprising:
a hardware-based processing system having a set of one or more processing units;
a hypervisor executing on each one of the processing units;
a plurality of virtual machines executing on the hypervisor;
an application-level dispatcher to receive a plurality of transaction requests associated with one or more network communication sessions, wherein the application-level dispatcher distributes a copy of each of the transaction requests to the plurality of virtual machines executing on the network node over a plurality of time steps to form a processing pipeline of the virtual machines;
one or more intrusion detection systems to detect whether any of the virtual machines in the processing pipeline has been compromised upon the distribution of a threshold number (n) of the transaction requests to the plurality of virtual machines by the dispatcher;
a control module that coordinates with the hypervisor to checkpoint the processing pipeline of virtual machines by recording a state for each of the plurality of virtual machines when none of the virtual machines in the processing pipeline has been compromised,
wherein, when at least one of the virtual machines in the processing pipeline has been compromised, the control module instructs the hypervisor to remove the compromised virtual machines from the processing pipeline and reorders the processing pipeline by promoting the non-compromised virtual machines to earlier stages in the processing pipeline that correspond to stages associated with the removed virtual machines.

8. The network node of claim 7, wherein the processing units include a plurality of processing units connected to the dispatcher by an unprivileged local area network within the network node and connected to the control unit by a privileged local area network within the network node.

9. The network node of claim 7, wherein the dispatcher provides a store-and-forward component that sends transaction requests to the virtual machines after each synchronization time step and sends responses to clients only after the one or more instruction detection systems verify integrity of the virtual machines post-transaction.

10. The network node of claim 7, wherein the control module instantiates new virtual machines and assigns the new virtual machines within stages previously associated with the non-compromised virtual machines that have been promoted to earlier stages in the processing pipeline.

11. The network node of claim 7, wherein the control module initializes the new virtual machines to a state previously recorded when check-pointing the processing pipeline.

12. The network node of claim 7, wherein the network node comprises a server.

13. The network node of claim 7, wherein the network node comprises a client device, the client device further comprising:
application software executing on the network node that issues the transaction requests as outbound transaction requests to a server,
wherein the application-level dispatcher receives the transaction requests from the application software.

14. The network node of claim 7, wherein the network node comprises a firewall, a gateway, a router, or a switch.

15. The network node of claim 7, wherein, after execution of each transaction, each of the virtual machines synchronizes resultant state data to a subsequent one of the virtual machines in the processing pipelines of virtual machines.

* * * * *